United States Patent [19]

Gunn

[11] 4,052,231

[45] Oct. 4, 1977

[54] STABLE COLLOID SOLUTION AND METHOD OF MAKING SAME

[75] Inventor: Walter H. Gunn, Painesville, Ohio

[73] Assignee: Diamond Shamrock Corporation, Cleveland, Ohio

[21] Appl. No.: 657,766

[22] Filed: Feb. 13, 1976

Related U.S. Application Data

[63] Continuation-in-part of Ser. No. 504,383, Sept. 9, 1974, Pat. No. 3,970,482, which is a continuation-in-part of Ser. No. 298,646, Oct. 18, 1972, abandoned.

[51] Int. Cl.$^2$ ............................ C23F 7/26; C08B 37/00
[52] U.S. Cl. ............................. 148/6.2; 106/208; 106/15 R; 424/131; 252/316; 252/380
[58] Field of Search .............. 148/6.2; 106/16, 205, 106/208, 209, 15 R, 18; 252/380, 316; 260/29.6 M, 29.6 MM, 45.75 G; 424/131

[56] References Cited

U.S. PATENT DOCUMENTS

| | | | |
|---|---|---|---|
| 3,553,034 | 1/1971 | Harvey et al. | 148/6.2 |
| 3,671,331 | 6/1972 | Malkin et al. | 148/6.2 |
| 3,687,739 | 8/1972 | Kennedy et al. | 148/6.2 |
| 3,907,608 | 9/1975 | Barrett et al. | 148/6.2 |

OTHER PUBLICATIONS

Moraine et al., "Kinetics of Xanthan Fermentation", Chemical Abstracts, vol. 78: 134477e.

*Primary Examiner*—Ralph S. Kendall
*Attorney, Agent, or Firm*—John J. Freer

[57] ABSTRACT

Aqueous solutions of xanthan gum hydrophilic colloid, that would otherwise support microbial growth, are preserved with chromic acid. The solutions should be at a pH above 3, and contain minimal amounts of reduced forms of chromium, if any, so that they will be storage stable not only against microbial growth, but also against gel formation.

5 Claims, No Drawings

STABLE COLLOID SOLUTION AND METHOD OF MAKING SAME

CROSS REFERENCE TO RELATED APPLICATIONS

This application is a Continuation-in-Part of U.S. patent application Ser. No. 504,383, filed Sept. 9, 1974, now U.S. Pat. No. 3,970,482, which in turn is a Continuation-in-Part of U.S. patent application Ser. No. 298,646, filed Oct. 18, 1972 and now abandoned.

BACKGROUND OF THE INVENTION

Xanthan gum hydrophilic colloid is typically available as a food grade product as well as an industrial grade product, both being offered commercially as dry, white powders. The industrial grade xanthan gum hydrophilic colloid, or more simply xanthan gum, will exhibit different physical properties from the food grade product. Also, the food grade product should generally show excellent suppression of microbial growth.

Both grades have extraordinary resistance to enzymatic degradation. And in the dry, powdery form, even the industrial grade product is resistant to microbial growth. However it is recommended that aqueous solutions of the industrial grade product contain preservative. This recommendation is made if the xanthan gum solution is to be stored for a period longer than only 24 hours. Thus, the present invention is particularly directed to solutions of the industrial grade material.

A variety of well known preservative substances have been successfully used with the industrial grade xanthan gum solutions for retarding bacterial action. It would of course be economically desirable if the material were to be resistant to bacterial action without preservative, when it is otherwise advantageous to have the xanthan gum in solution, and when such solutions may be prepared more than 24 hours before use.

One of the uses of the industrial grade material, where it comes into contact with chromic acid, is in the preparation of coating compositions. For example it has been shown in U.S. Pat. No. 3,671,331 that coating compositions containing chromic acid and providing excellent corrosion resistance for metal substrates, can further desirably contain xanthan gum in the composition. This patent also teaches that it can be further desirable, such as prior to shipping and storage, to pre-package various composition ingredients. Subsequent blending is then used to prepare the coating composition.

Chromic acid, even in quite dilute aqueous solutions readily provides for such solutions being at a very low pH. For example as little as 0.25 weight percent of chromic acid in water will yield a solution pH of about 1.7. Further, chromic acid is a powerful oxidizing agent. The problems that can be encountered with solutions of xanthan gum and chromic acid are not unique to the gum since chromic acid is so voracious an oxidizer that it has well recognized incompatibility in aqueous solution with many industrial products.

SUMMARY OF THE INVENTION

In continuing efforts using the industrial grade xanthan gum in compositions containing chromic acid, it has been discovered that such solutions can be resistant to bacterial action without recommended preservative. Such finding was only successfully achieved after it was also discovered that the incompatibilities of the components, to prepare a storage stable aqueous solution, can be overcome by providing that the solution has a pH above 3, as well as by suppressing in the solution, or eliminating from the solution, any reduced forms of chromium.

Thus in its broadest aspect the present invention is directed to a stabilized aqueous composition containing solubilized xanthan gym hydrophilic colloid which will otherwise support microbial growth, with composition being resistant to microbial growth while exhibiting suppressed gel formation, and with the composition comprising, in aqueous solution, xanthan gum hydrophilic colloid and chromic acid, and further with the solution being at a pH above 3 and having reduced forms of chromium, if such exist, at substantially below 5 percent of the hexavalent chromium.

In recommending preservation, suppliers of xanthan gum hydrophilic colloid caution against degradation by bacterial action or from support of microbial growth. For purposes of this invention, no distinction is drawn between resistance to bacterial action and resistance to microbial growth.

DESCRIPTION OF THE PREFERRED EMBODIMENTS

The xanthan gum hydrophilic colloid, known commercially simply as "xanthan gum", which term may also be used herein for convenience, may also be termed a heteropolysaccharide, or carbohydrate, as they can be produced by the fermentation of a carbohydrate, for example by the bacterium *Xanthomonas campestris*. Such xanthan gum hydrophilic colloids are complex in nature and have high molecular weight, e.g., more than one million is typical. Such substance is available as a powder that exhibits solubility in water. The use of the xanthan gum hydrophilic colloid in water, even in very minor amounts, exhibits excellent suspending property. Thus, although greater amounts may be used, a 1% solution of the xanthan gum hydrophilic colloid will support a 10 weight percent blend of a very finely divided silica sand for several days; this suspending power is ostensibly independent of suspension pH. The preparation of the xanthan gum hydrophilic colloids, and most particularly from the bacterium *Xanthomonas compestris*, has been extensively discussed, for example in U.S. Pat. No. 3,659,026, and solution characteristics in water for such hydrophilic colloid are also discussed in that patent.

The chromic acid may be supplied to the composition as chromic acid or it may also be supplied by equivalents to chromic acid, for example, chromium trioxide or chromic acid anhydride. The chromic acid may be present in small amount, for example at a concentration of about 0.01 gram of $CrO_3$ per liter. For a composition that will eventually be used to prepare a coating composition that might contain chromic acid and pulverulent zinc, such as taught in U.S. Pat. No. 3,687,738, the chromic acid may be present in substantially greater amounts, for example 80–100 grams of $CrO_3$ per liter of water.

Since chromic acid in an amount greater than about one gram of $CrO_3$ per liter of water will provide a composition pH below 3, when a greater amount of the acid is present, a pH adjustment agent is used. Such agent should be basic, and by this it is meant that the agent will yield a solution pH above 7.0 when the agent is dissolved in distilled or deionized water. Also, such agent should have sufficient water solubility in the aqueous chromic acid solution of the composition, i.e., be acid soluble, so as to provide for the necessary pH adjustment. Thus, by "compatibility" of the agents, as such term is used herein, is meant the foregoing characteristics, as well as the quality of being essentially chemically inert towards the chromic acid. That is, the agent must behave in acid solution in a manner to not deleteriously reduce the hexavalent chromium provided by the chromic acid. It is however contemplated to use compatible pH adjusting agents that may have very minor effect in regard to reduction of the hexavalent chromium under very acidic conditions. For such use, there is initially used for pH adjustment an agent that will operate for initial adjustment of pH without commensurate, deleterious chromium reduction. Thus, initial adjustment might elevate the composition pH to a range of about 3-4, then a differing agent, more sensitive to acidic conditions concerning chromium reduction, may be used for final pH adjustment of the component without affecting chrome reduction.

Representative compatible pH adjusting agents include metallic oxides, carbonates and hydroxides. Typically the metals of the oxides and the like will be from Groups 1A or IIA, or metals in groups aove IIA, i.e., to the right of the IIA Group in the periodic table, such as zinc oxide as a representative of Group IIB. So long as such substances have compatibility, they are regarded as suitable pH adjusting agents.

When used, the agent is blended into the composition to provide for an adjusted pH of the constituent within the range of from 3 to 7, inclusive. The amount of agent actually used will of course depend upon the concentration of the chromic acid in the composition and on the neutralizing strength of the pH adjustment agent. It is most practicable to measure the composition pH during adjustment for considering the amount of pH adjustment agent to be added.

For some of the coating compositions of the prior art, e.g., as discussed in the above-mentioned U.S. Pat. No. 3,671,331, it is useful for the coating compositions to contain chromic acid and a reducing agent therefore. If a reducing agent is present in the composition of the present invention, it must be water soluble and exhibit suppressed action, or no reducing action towards the hexavalent chromium. If reduced forms of chromium exist, i.e., if chrome is present in a valence state lower than hexavalent, such should provide substantially below 5 percent and preferably below one percent, of the hexavalent chromium of the composition. Reducing agents taught in the prior art include succinic acid or the other $C_5$-$C_{14}$ dicarboxylic acids, as have been disclosed in U.S. Pat. No. 3,382,081, and may be used alone, or in mixture, or in mixture with other organic substances exemplified by aspartic acid, acrylamide or succinimide, and further include such agents as have been disclosed in U.S. Pat. Nos. 3,535,166 and 3,535,167. These reducing agents will typically exhibit ready solubility in water along with chromic acid. Aqueous solutions of xanthan gum will typically tolerate up to 60% of water miscible solvents, and such are contemplated to be present in the composition of the present invention, so long as such solvents do not deleteriously reduce the hexavalent chromium, although the composition will generally be simply water based ostensibly for economy.

The compatibility of the xanthan gum hydrophilic colloid with additional gums can result in useful blends that may also be used in the present invention. For example, in the above-mentioned U.S. Pat. No. 3,659,026, a particularly useful blend has been taught that includes the xanthan gum along with locust bean gum. Such blends contain between about 5-95% weight percent of the xanthan gum. Additional gums which exhibit compatibility with the xanthan gum include other natural gum thickeners such as guar gum, karaya gum and tragacanth gum that can be used in aqueous media for their thickening power.

Upon formulation of the composition with its appropriate ingredients, appropriate pH and requisite freedom from reduced forms of chrome, such is then ready for storage or shipment. In the formulation it is preferred, for suppressed gel formation, that a chromic acid aqueous solution of appropriate pH be first prepared. Typically, the chromic acid may simply be dissolved in water, and the pH then adjusted. Following this, the xanthan gum can then be added to the solution. Preferably for ease of formulation, the xanthan gum is prepared as a separate solution in aqueous medium and this solution is then blended with the chromic acid solution. With this method, other ingredients, e.g., reducing agents, may be present in either the chromic acid solution, or the xanthan gum solution or in both.

For exemplary purposes, a composition is prepared that contains, per liter of water, 20 grams of chromic acid, 3.33 grams of succinic acid and 1.67 grams of succinimide. The succinic acid and succinimide offer no immediate deleterious reduction of the hexavalent chromium, although they find utility in coating compositions, with chromic acid, as taught in U.S. Pat. No. 3,382,081. Five aliquot portions of this blend are taken and the pH of each aliquot is adjusted with zinc oxide to provide separate compositions at pH values of 1, 2, 3, 4 and 5.

A separate constituent is blended to contain, per liter of water, 1.5 grams per liter of a commercially available industrial grade of xanthan gum hydrophilic colloid, which is a heteropolysaccharide prepared from the bacteria specie *Xanthomonas campestris* and has a molecular weight in excess of 200,000. The manufacturer of this colloid recommends addition of preservative to resist microbial growth when aqueous solutions of this colloid are to be maintained for greater than 24 hours. Additionally, this composition contains 1 drop per liter of a wetter which is a nonionic, modified polyethoxide adduct having a viscosity in centipoises at 25° C of 180 and a density of 25° C of 8.7 pounds per gallon.

Aliquot portions of the colloid solution are taken and one such aliquot is blended with each of the chromic acid solutions on a basis providing a volume of colloid solution equal to the volume of chromic acid solution. By visual observation, all five freshly prepared solutions are seen to be light orange solutions, as expected. Each solution is then placed in an oven maintained at a constant 50° C. At various intervals, as shown in the table below, the solutions are scrutinized by visual observation.

TABLE

| pH of Test Composition | Appearance of Test Composition | | |
|---|---|---|---|
| | Initial | 24 Hour | 4½ Days |
| 1 | Light Orange Solution | Dark Brown | Dark Brown Gel |
| 2 | Light Orange Solution | Medium Brown | Medium Brown Gel |
| 3 | Light Orange Solution | Brownish Trace | Orange Gel |
| 4 | Light Orange Solution | N.A. | N.A. |
| 5 | Light Orange | Light Orange | Light Orange |

TABLE-continued

| pH of Test Composition | Appearance of Test Composition | | |
|---|---|---|---|
| | Initial | 24 Hour | 4½ Days |
| | Solution | Solution | Solution |

N.A. = Not Available

Similar test compositions, with pH adjusted to above 3, have been stored, in air tight containers, at room temperature for many months without deleterious change. Such compositions are thus desirably stabilized against gel formation s well as being resistant to microbial growth.

I claim:

1. A stabilized aqueous composition containing solubilized xanthan gum hydrophilic colloid, which colloid in solution will otherwise support microbial growth, said composition being resistant to microbial growth while exhibiting suppressed gel formation, said composition comprising, in aqueous solution, xanthan gum hydrophilic colloid and chromic acid, said solution being at a pH above 3 and having reduced forms of chromium, if such exist, at substantially below 5 percent of the solution hexavalent chromium.

2. The composition of claim 1 characterized by having adjusted pH within the range of from 3 to 7.

3. The composition of claim 1 wherein said colloid supplies a portion of thickeners.

4. The method of preparing a stabilized aqueous composition containing solubilized xanthan gum hydrophilic colloid, which colloid solution will otherwise support microbial growth, wherein said prepared composition is resistant to microbial growth while achieving suppressed gel formation, which method comprises preparing a solution of chromic acid in aqueous medium and at a pH of from 3 to 7, and then combining xanthan gum hydrophilic colloid with said chromic acid solution.

5. The method of claim 4 further characterized by adding to said chromic acid solution an aqueous solution of said colloid.

* * * * *